United States Patent
Hsu

(10) Patent No.: US 7,356,683 B2
(45) Date of Patent: Apr. 8, 2008

(54) SYSTEM AND METHOD FOR MONITORING BIOS MESSAGES OF REMOTE COMPUTERS BY A LOCAL SERVER

(75) Inventor: Chih-Chiang Hsu, Tu-Cheng (TW)

(73) Assignee: Hon Hai Precision Industry Co., Ltd., Tu-Cheng, Taipei Hsien (TW)

(*) Notice: Subject to any disclaimer, the term of this patent is extended or adjusted under 35 U.S.C. 154(b) by 470 days.

(21) Appl. No.: 11/025,810

(22) Filed: Dec. 28, 2004

(65) Prior Publication Data
US 2005/0210232 A1  Sep. 22, 2005

(30) Foreign Application Priority Data
Mar. 19, 2004  (TW) .............................. 93107404 A

(51) Int. Cl.
*G06F 15/177* (2006.01)
(52) U.S. Cl. ............................................ 713/2; 714/57
(58) Field of Classification Search ................ 713/1, 713/2; 714/57
See application file for complete search history.

(56) References Cited

U.S. PATENT DOCUMENTS 6,038,689 A * 3/2000 Schmidt et al. ................ 714/48
6,324,644 B1 * 11/2001 Rakavy et al. .................. 713/1
6,629,240 B1   9/2003 Lee ................................ 713/2

FOREIGN PATENT DOCUMENTS

CN  1283029 A  2/2001

OTHER PUBLICATIONS

Fu-Sheng Liu & Hai-Lei Qiu, "Usage of Power-on self-test and a Malfunction Diagnosis Card of a Computer", Electronic World, Dec. 31, 2003, p. 15-16, Volume No. 11, Beijing, P.R. China.

* cited by examiner

*Primary Examiner*—Thuan Du
(74) *Attorney, Agent, or Firm*—Morris Manning Martin LLP; Tim Tingkang Xia, Esq.

(57) ABSTRACT

A system for monitoring BIOS (Basic Input/Output System) messages of remote computers by a local server includes: the local server (1) for executing a monitoring program (11) to send requests for acquiring BIOS messages, and receive and display the BIOS messages; the remote computers (2), each remote computer executing a POST (Power On Self Test) program for outputting the BIOS messages, receiving a request for acquiring the BIOS messages from the local server, and transmitting the BIOS messages to the local server; and a network (3) for connecting the local server with the remote computers. Each remote computer includes a CPU (Central Processing Unit) (21) for executing the POST program and outputting the BIOS messages, a remote control card (22) for detecting and capturing the BIOS messages, and a PCI (Peripheral Component Interconnect) bus (23) for connecting the CPU with the remote control card. Related methods are also provided.

15 Claims, 3 Drawing Sheets

SYSTEM AND METHOD FOR MONITORING BIOS MESSAGES OF REMOTE COMPUTERS BY A LOCAL SERVER

BACKGROUND OF THE INVENTION

1. Field of the Invention

The present invention is related to a system and method for monitoring BIOS (Basic Input/Output System) messages of computers, and more particularly to a system and method for monitoring BIOS messages of remote computers by a local server.

2. Prior Art of the Invention

In a typical computer system, a BIOS (Basic Input/Output System) performs the whole initialization and test of the system when the system is turned on. When the computer is powered on, the BIOS tests the components of the computer, including the CPU (Central Processing Unit), main memory, ROM (Read Only Memory), main-board, CMOS (Complementary Metal-Oxide Semiconductor) memory, serial interface, parallel interface, floppy disk, hard disk, keyboard, mouse, and so on. This test is usually referred to as a POST (Power On Self Test). At the time of operation of a POST, the BIOS outputs values from each step of the POST to certain input/output addresses. An input/output address is usually referred to as an I/O port. For an ISA (Industry Standard Architecture) bus, the I/O address is 0×80, and the range of the 0×80 port ID is from 0 to 255. The 0×80 port is hereinafter referred to as an I/O80 port. When the POST is successfully completed, the system loads an OS (Operating System) in a designated disk.

The values output by the BIOS are referred to as BIOS messages. The BIOS messages include digital codes defined by the computer manufacturer of characters of a computer, and descriptions of the characters of the computer. When the computer is powered on, the BIOS messages are displayed in the computer monitor during the POST for the computer user to monitor the BIOS messages.

Some users need to monitor BIOS messages of a remote computer when the remote computer is powered on at the same time as the user's local computer. Furthermore, in many large businesses, a user needs to monitor the BIOS messages of a plurality of remote computers through a local server.

In order to meet these needs, recent patents in the art include U.S. Pat. No. 6,629,240 entitled "Method for monitoring system boot by searching a temporary buffer for BIOS messages" and issued on Sep. 30, 2003. The patent discloses a method for monitoring BIOS messages, comprising: reproducing the data of a screen buffer of a video RAM (random-access memory) area into a temporary buffer in a program; searching for specific BIOS messages in the temporary buffer reproduced from the screen buffer; and reporting the search result to a remote system manager.

However, before the BIOS messages are transmitted to the remote system manager, the BIOS messages must be stored in the system buffer. This consumes valuable system memory resources, and makes the method unduly complicated. Therefore, a more effective and convenient system and method for monitoring BIOS messages of remote computers by a local server is desired.

SUMMARY OF THE INVENTION

An object of the present invention is to provide a system for monitoring BIOS messages of remote computers by a local server, the system detecting and capturing the BIOS messages from PCI (Peripheral Component Interconnect) buses in the remote computers.

Another object of the present invention is to provide a method for monitoring BIOS messages of remote computers by a local server, the method detecting and capturing the BIOS messages from PCI buses in the remote computers.

To achieve the first object, a preferred embodiment of a system for monitoring BIOS messages of remote computers from a local server is provided. The system comprises: the local server for executing a monitoring program to send requests for and receive the BIOS messages of the remote computers, and display the BIOS messages; a plurality of remote computers for executing POST programs, outputting the BIOS messages, detecting and capturing the BIOS messages, and receiving requests and transmitting the BIOS messages to the local server; and a network for connecting the local server with the remote computers. Each of the remote computers comprises: a CPU for processing the POST programs and outputting the BIOS messages; a remote control card for detecting the BIOS messages and capturing the BIOS messages; and a PCI bus for connecting the CPU with the remote control card.

To achieve the second object, a preferred embodiment of a method for monitoring BIOS messages of remote computers from a local server is provided. The method comprises the steps of: detecting the BIOS messages from the PCI bus in the remote computer; determining whether the BIOS messages from the PCI bus have been detected; recording the BIOS messages into a queue; determining whether a request from the local server has been received; transmitting the BIOS messages to the local server; and displaying the BIOS messages in the local server.

Other objects, advantages and novel features of the present invention will be drawn from the following detailed description of the preferred embodiment and preferred methods thereof together with the attached drawings, in which:

DETAILED DESCRIPTION OF THE PREFERRED EMBODIMENT

Figure 1:
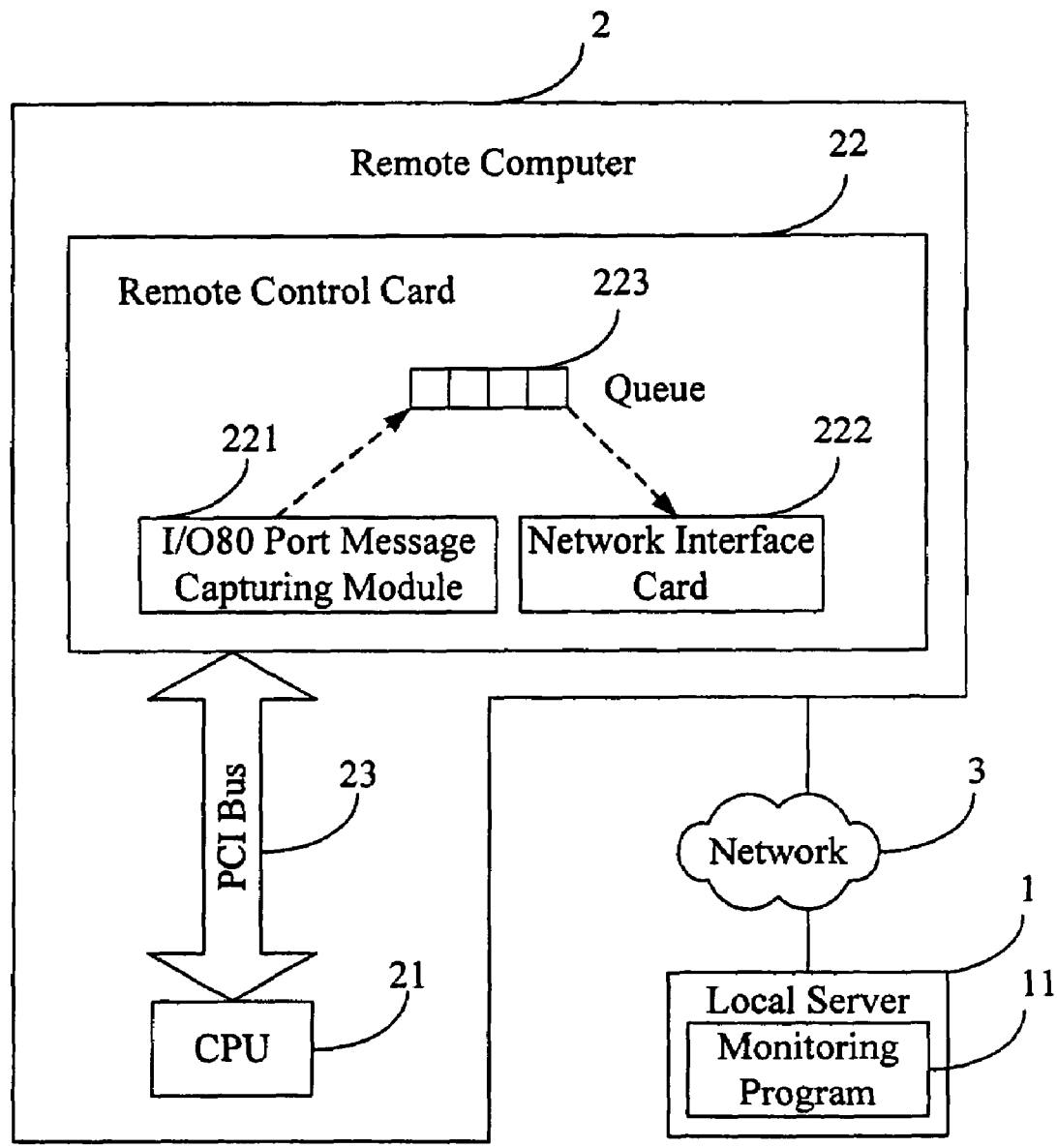
FIG. 1 is a schematic diagram of hardware infrastructure of a system for monitoring BIOS messages of remote computers by a local server in accordance with the preferred embodiment of the present invention.

FIG. 1 is a schematic diagram of hardware infrastructure of a system for monitoring BIOS (Basic Input/Output System) messages of remote computers by a local server (hereinafter, "the system"), in accordance with the preferred embodiment of the present invention. The system comprises a local server 1, a plurality of remote computers 2 (only one shown), and a network 3 connecting the local server 1 with the remote computers 2.

The local server 1 contains a monitoring program 11 installed therein. The local server 1 sends requests for acquiring BIOS messages to the remote computers 2, and receives and displays the BIOS messages of the remote computers 2.

Each of the remote computers 2 comprises a CPU (Central Processing Unit) 21, a remote control card 22, and a PCI (Peripheral Component Interconnect) bus 23. The remote computer 2 executes a POST (Power On Self Test) program thereof, outputs corresponding BIOS messages, and transmits the BIOS messages to the local server 1. The CPU 21 is for executing the POST program and outputting the BIOS messages. The remote control card 22 is for detecting and capturing the BIOS messages from the CPU 21 via the PCI bus 23. Further, the remote control card 22 comprises an I/O80 port message capturing module 221, a network interface card 222, and a queue 223. The I/O80 port message capturing module 221 is for detecting and capturing I/O80 port messages from the PCI bus 23, and recording the I/O80 port messages into the queue 223. In the preferred embodiment, the I/O80 port messages are BIOS messages. The network interface card 222 is for connecting the remote computer 2 to the network 3, providing an interface for receiving requests for the I/O80 port messages from the local server 1, and transmitting the I/O80 messages from the queue 223 to the local server 1. The remote computer 2 may be a desktop computer, a laptop computer, a computer server, or any other suitable computing device.

The network 3 is an electronic communications network that supports a Transmission Control Protocol and an Internet Protocol (TCP/IP). The network 3 can be an intranet, the Internet, or any other suitable type of communications network.

Figure 2:
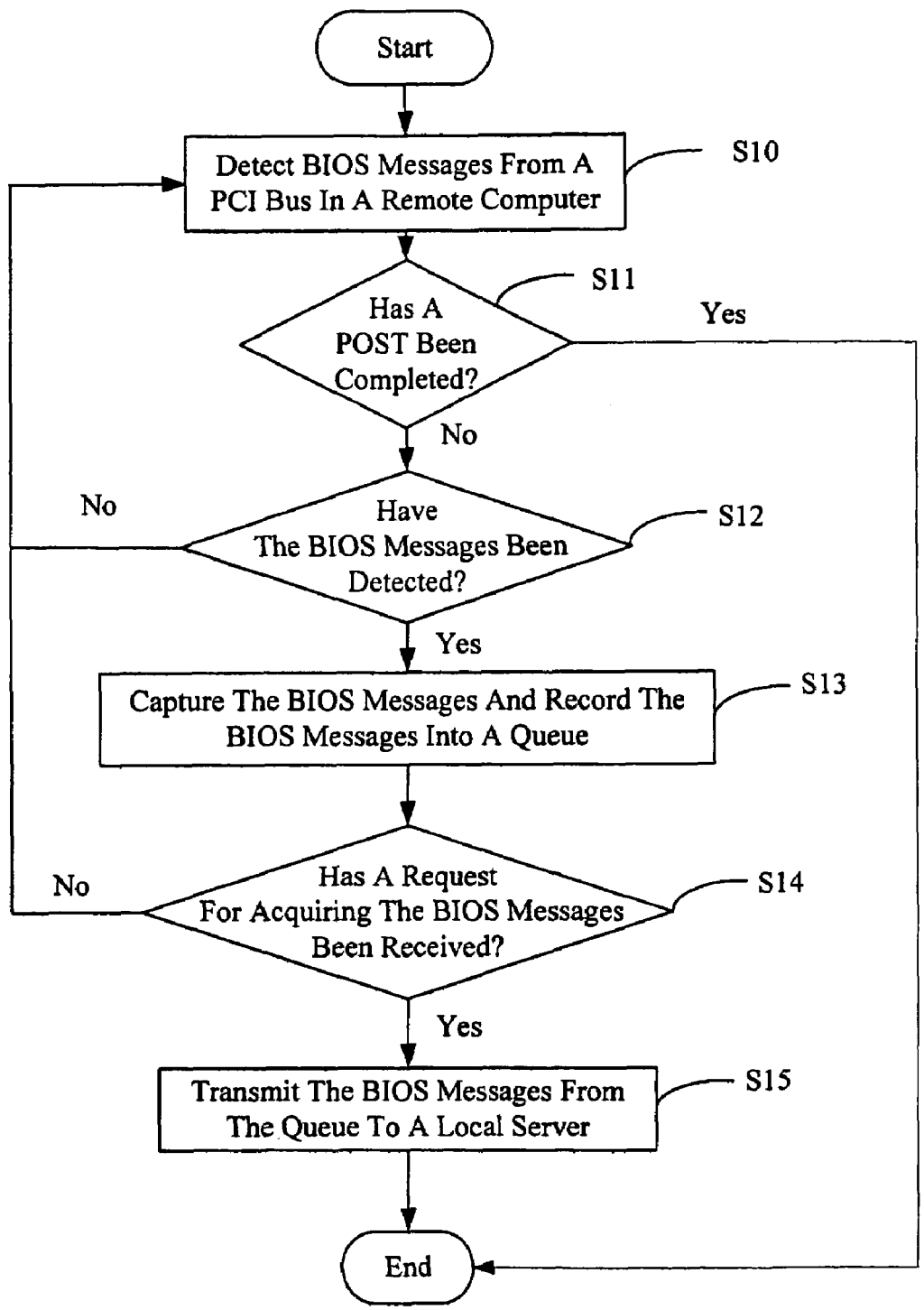
FIG. 2 is a flow chart of a preferred method for capturing BIOS messages of a remote computer and transmitting the BIOS messages to a local server, according to the present invention.

FIG. 2 is a flow chart of the preferred method for capturing BIOS messages of a remote computer 2 and transmitting the BIOS messages to the local server 1. Generally, when being powered on, the remote computer 2 boots a BIOS to execute a POST program, and outputs corresponding BIOS messages through the PCI bus 23. The BIOS messages, namely I/O80 port messages, contain digital codes of the remote computer 2 and a description of the digital codes. BIOS vendors such as Phoenix and AMI (two major BIOS vendor in the IT market) define the digital codes and descriptions of the digital codes. For example, the digital codes are characters for specifying the configuration or performance of the remote computer 2, which usually comprise information on a CPU, one or more hard-disks and RAMs, and a network condition. The digital codes have corresponding descriptions such as, for example, "CELERON 1800M," "RAM 256M," and "SYSTEM RAM PASSED."

In step S10, the I/O80 port message capturing module 221 detects the BIOS messages from the PCI bus 23. In step S11, the CPU 21 determines whether the POST has been completed. If the POST has been completed, the procedure is finished. In contrast, if the POST has not been completed, in step S12, the CPU 21 determines whether the I/O80 port message capturing module 221 has detected the BIOS messages. If the I/O80 port message capturing module 221 has not detected the BIOS messages, the procedure returns to step S10 described above. In contrast, if the I/O80 port message capturing module 221 has detected the BIOS messages, in step S13, the I/O80 port message capturing module 221 captures the BIOS messages, and records the BIOS messages into the queue 223. Then in step S14, the CPU 21 determines whether the network interface card 222 has received a request for acquiring the BIOS messages from the local server 1. If the network interface card 222 has not received such a request, the procedure returns to step S10 described above. In contrast, if the network interface card 222 has received the request, in step S15, the I/O80 port message capturing module 221 reads the BIOS messages from the queue 223, and the network interface card 222 transmits the BIOS messages to the local server 1 through the network 3, whereupon the procedure is finished.

Figure 3:
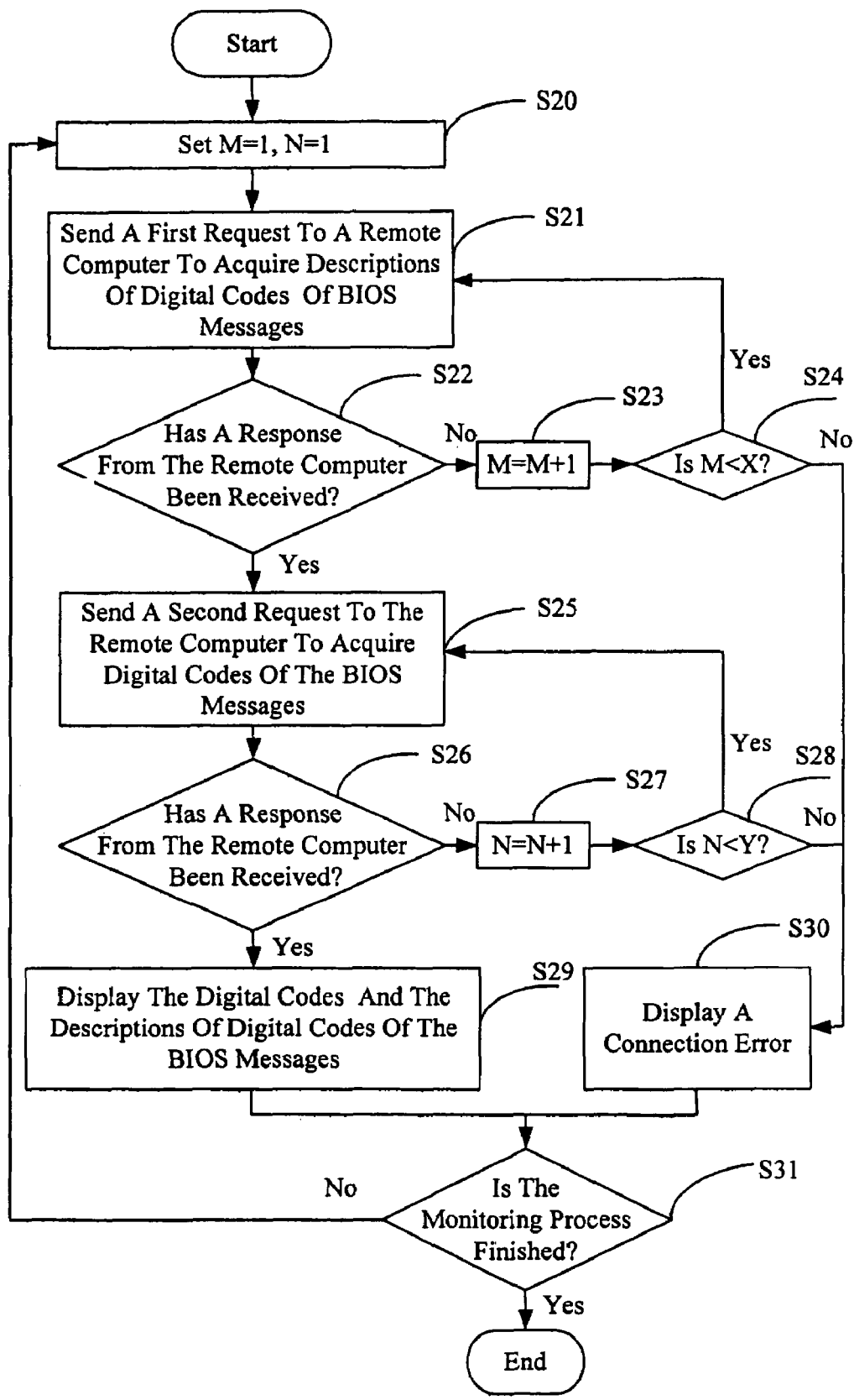
FIG. 3 is a flow chart of a preferred method for monitoring BIOS messages of a plurality of remote computers by a local server, according to the present invention.

FIG. 3 is a flow chart of a preferred method for monitoring BIOS messages of a plurality of remote computers 2 by the local server 1. The local server 1, executes the monitoring program 11 installed therein. Accordingly, the local server 1 sends requests for acquiring BIOS messages to the remote computers 2, and receives and displays the BIOS messages of the remote computers 2. That is, the local server 1 can monitor all the remote computers 2 at the same time.

In step S20, the monitoring program 11 sets values of both of variables M and N as 1. In step S21, the monitoring program 11 sends a first request to each remote computer 2 to acquire descriptions of digital codes of the BIOS messages. In step S22, the monitoring program 11 determines whether a response to the first request from the remote computer 2 has been received. If the response has been received, the procedure goes directly to step S25 described below. If the response has not been received, in step S23, the monitoring program 11 increases the value of M by 1. Then in step S24, the monitoring program 11 determines whether M is less than a preset number X. X is defined by an authorized user of the local server 1, for ensuring that the description of the digital codes can be acquired after a certain number of requests. X can be any natural number greater than 1, such as 5, 10 or 20. If M is less than X, the procedure returns to step S21 described above. If M is not less than X, the procedure goes to step S30 described below.

In step S25, the monitoring program 11 sends a second request to the remote computer 2 to acquire the digital codes of the BIOS messages. In step S26, the monitoring program 11 determines whether a response to the second request from the remote computer 2 has been received. If the response has been received, the procedure goes directly to step S29 described below. Otherwise, if the response has not been received, in step S27, the monitoring program 11 increases the value of N by 1. Then in step S28, the monitoring program 11 determines whether N is less than a preset number Y. Y is also defined by the authorized user, for ensuring that the digital codes can be acquired after a certain number of requests. Y can be any natural number greater than 1, such as 5, 10 or 20. If N is less than Y, the procedure returns to step S25 described above. If N is not less than Y, the procedure goes to step S30 described below.

In step S29, the local server 1 displays the digital codes and the descriptions of digital codes of the BIOS messages, whereupon the procedure goes to step S31 described below. In step S30, the local server 1 displays a connection error, whereupon the procedure goes to step S31. In step S31, the monitoring program 11 determines whether the monitoring process is finished. If the monitoring process is finished, the procedure is also finished. In the contrast, if the monitoring process is not finished, the procedure returns to step S20 described above.

Although the present invention has been specifically described on the basis of a preferred embodiment and preferred methods, the invention is not to be construed as being limited thereto. Various changes or modifications may be made to the embodiment and methods without departing from the scope and spirit of the invention.

What is claimed is:

1. A system for monitoring BIOS (Basic Input/Output System) messages of remote computers by a local server, the system comprising:

a local server for executing a monitoring program to send requests for acquiring BIOS messages, and receive and display the BIOS messages;

a plurality of remote computers, each of the remote computers executing a POST (Power On Self Test) program for outputting the BIOS messages, receiving a request for acquiring the BIOS messages from the local server, and transmitting the BIOS messages to the local server, each of the remote computers comprising:

a CPU (Central Processing Unit) for processing the POST program and outputting the BIOS messages;

a remote control card; and a PCI (Peripheral Component Interconnect) bus for connecting the CPU with the remote control card;

wherein the remote control card comprises an I/O80 port message capturing module for detecting and capturing the BIOS messages from the PCI bus, and recording the BIOS messages into a queue; and a network for connecting the local server with the remote computers.

2. The system according to claim 1, wherein the BIOS messages are I/O80 port messages.

3. The system according to claim 1, wherein the remote control card further comprises a network interface card for providing an interface connecting the remote computer with the network, receiving the BIOS messages from the queue, and transmitting the BIOS messages to the local server through the network.

4. A method for monitoring BIOS (Basic Input/Output System) messages of remote computers by a local server, the method comprising the steps of:

executing a monitoring program in the local server;

detecting BIOS messages from a PCI (Peripheral Component Interconnect) bus in each remote computer;

determining whether the BIOS messages from the PCI bus have been detected by the remote computer;

capturing the BIOS messages, and recording the BIOS messages into a queue of the remote computer;

transmitting the BIOS messages to the local server; and displaying the BIOS messages in the local server.

5. The method according to claim 4, further comprising the step of:

determining whether a request for acquiring the BIOS messages has been received from the local server.

6. The method according to claim 4, further comprising the step of determining whether a POST (Power On Self Test) has been completed.

7. The method according to claim 4, wherein the BIOS messages are I/O80 port messages.

8. The method according to claim 4, wherein the step of executing a monitoring program in the local server comprises the steps of:

sending a request to the remote computers to acquire the BIOS messages;

waiting for the remote computers to respond to the request; and repeating sending of the request to the remote computers, if no response to the request is received from the remote computers.

9. The method according to claim 8, wherein the step of executing a monitoring program in the local server further comprises the steps of:

determining whether the number of times of sending of the request to the remote computers is more than a preset threshold number of times; and displaying an error message if the number of times of sending of the request to the remote computers is not less than the preset threshold number of times.

10. The method according to claim 8, wherein the BIOS messages comprise digital codes and corresponding descriptions of digital codes of the remote computers.

11. The method according to claim 10, wherein the step of sending a request to the remote computers to acquire the BIOS messages comprises sending a first request to acquire the descriptions of digital codes of the remote computers, and then sending a second request to acquire the corresponding digital codes of the remote computers.

12. The method according to claim 4, wherein the local server can monitor BIOS messages of a plurality of remote computers at the same time.

13. A method for monitoring basic input/output system (BIOS) messages of remote computers by a local server, the method comprising the steps of:

retrieving BIOS messages in case that said remote computers start and run a power on self test (POST);

sending a request to said remote computers to acquire said BIOS messages;

waiting for said remote computers to respond to said request;

repeating sending of said request to said remote computers if no response to said request is received from said remote computers;

transmitting said BIOS messages to said local server if a response to said request is received from said remote computers; and displaying user-understandable information about said remote computers on said local server according to said BIOS messages.

14. The method according to claim 13, wherein said retrieving and transmitting steps are achievable by a remote control card of each of said remote computers having a queue to record said BIOS messages before said transmitting step.

15. The method according to claim 13, wherein said BIOS messages include digital codes and descriptions of said digital codes.

* * * * *